Dec. 17, 1968     HANS-DIETER KINNER     3,416,551
FLUID DIFFUSION LOGIC SYSTEM
Filed March 7, 1967                 6 Sheets-Sheet 1
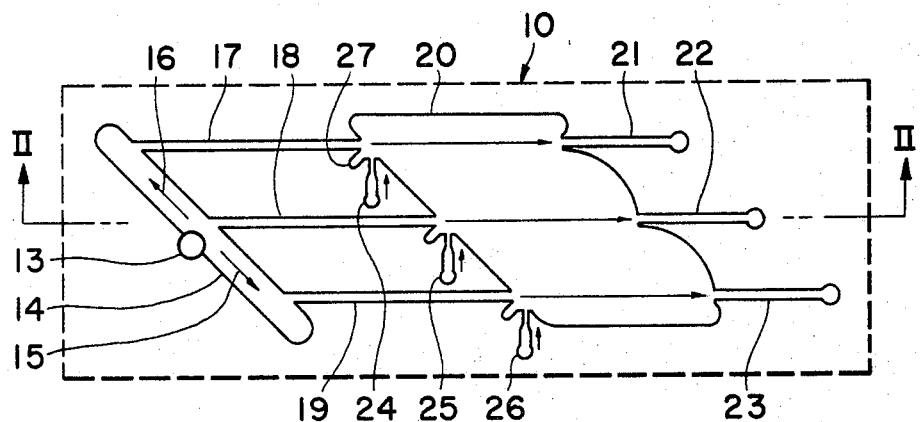
FIG. I
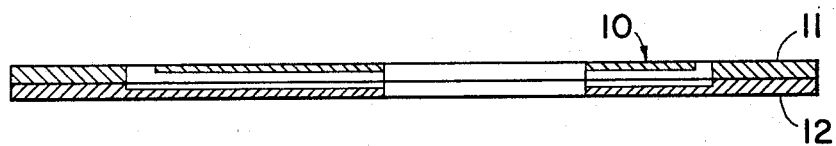
FIG. II
INVENTOR.
HANS-DIETER KINNER
BY
AGENT

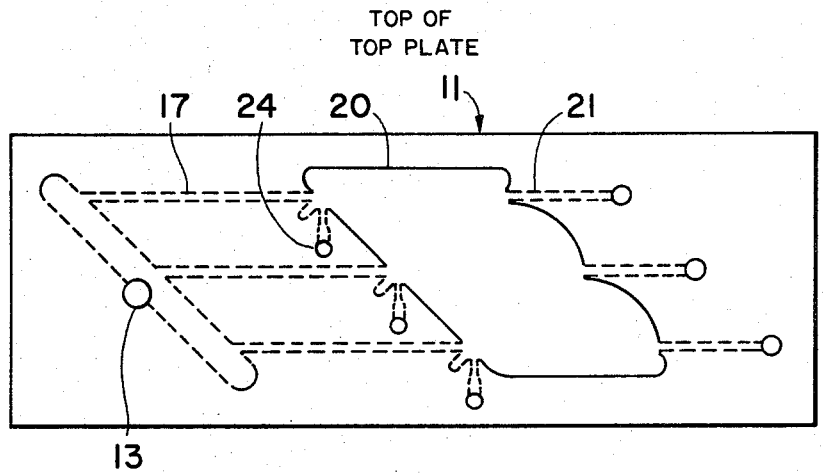
FIG. III
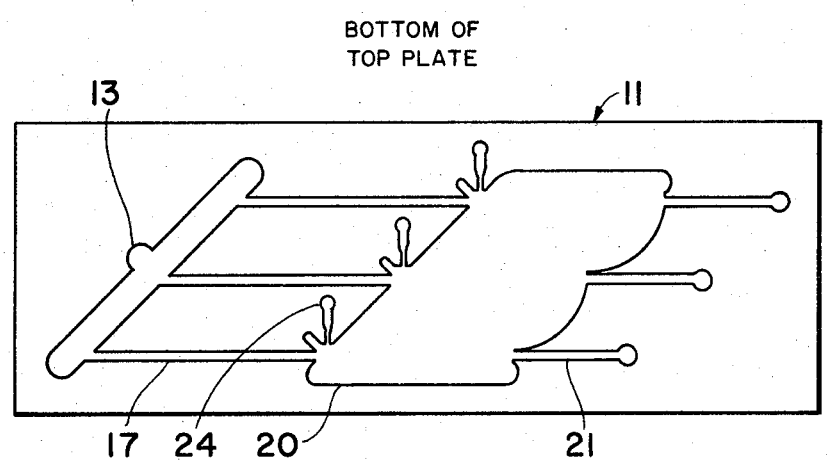
FIG. IV

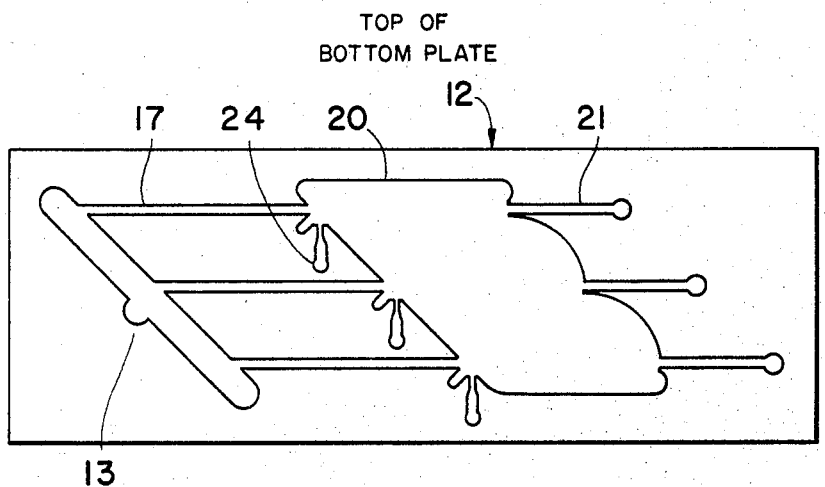
FIG. V
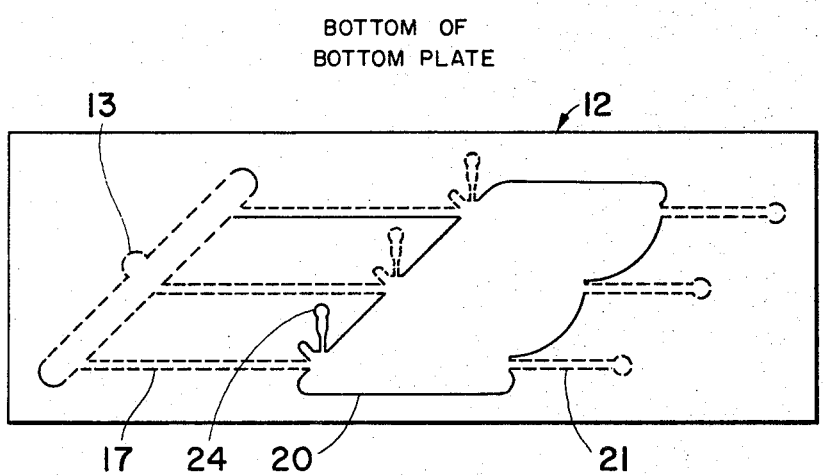
FIG. VI

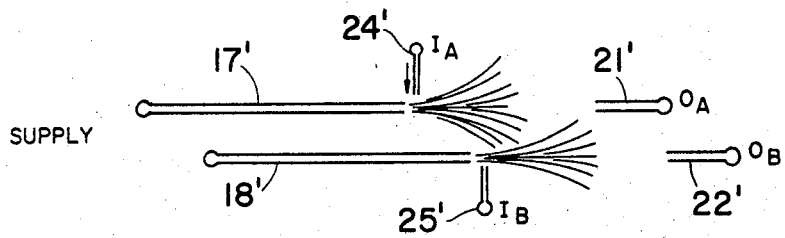
FIG. VII
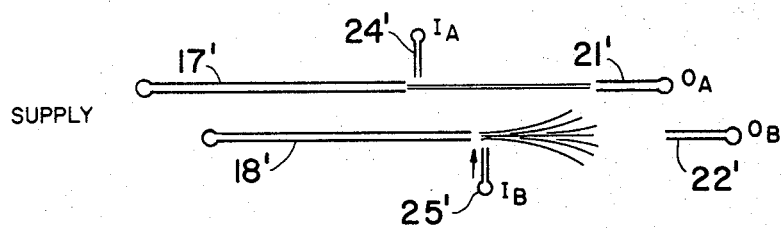
FIG. VIII
| $I_A$ | $I_B$ | $O_A$ | $O_B$ |
|---|---|---|---|
| 1 | 0 | 0 | 0 |
| 0 | 1 | 1 | 0 |
| 0 | 0 | 1 | 1 |
FIG. IX Dec. 17, 1968    HANS-DIETER KINNER    3,416,551
FLUID DIFFUSION LOGIC SYSTEM
Filed March 7, 1967    6 Sheets-Sheet 5
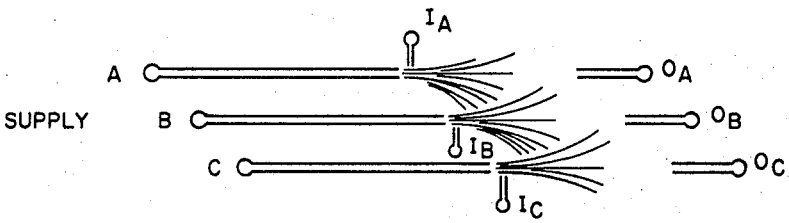
FIG. X
| $I_A$ | $I_B$ | $I_C$ | $O_A$ | $O_B$ | $O_C$ |
|---|---|---|---|---|---|
| 1 | 0 | 0 | 0 | 0 | 0 |
| 0 | 1 | 0 | 1 | 0 | 0 |
| 0 | 0 | 1 | 1 | 1 | 0 |
FIG. XI
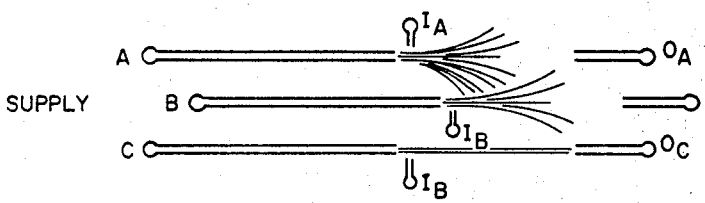
FIG. XII
| $I_A$ | $I_B$ | $I_C$ | $O_A$ | $O_B$ | $O_C$ |
|---|---|---|---|---|---|
| 1 | 0 | 0 | 0 | 0 | 1 |
| 0 | 1 | 0 | 1 | 0 | 1 |
| 0 | 0 | 1 | 1 | 0 | 0 |
FIG. XIII
INVENTOR.
HANS-DIETER KINNER
BY
Lawrence H. Peton
AGENT

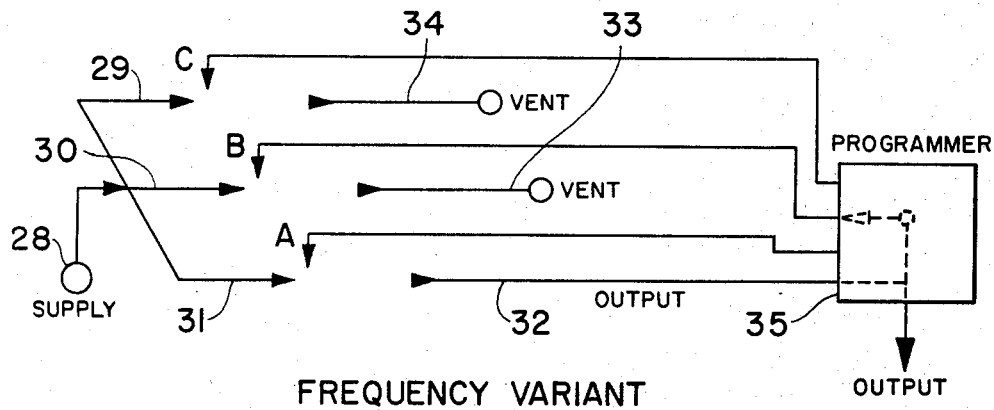
FREQUENCY VARIANT
FIG. XIV
| A | B | C | 1 | 2 | 3 |
|---|---|---|---|---|---|
| 1 | 0 | 0 | X | | |
| 0 | 1 | 0 | | X | |
| 0 | 0 | 1 | | | X |
OUTPUT FREQUENCY DECREASING →
FIG. XV United States Patent Office 3,416,551
Patented Dec. 17, 1968

3,416,551
FLUID DIFFUSION LOGIC SYSTEM
Hans-Dieter Kinner, Attleboro, Mass., assignor to The Foxboro Company, Foxboro, Mass., a corporation of Massachusetts
Filed Mar. 7, 1967, Ser. No. 621,193
7 Claims. (Cl. 137—81.5)

ABSTRACT OF THE DISCLOSURE

Two diffusion functions are laterally adjacent and lengthwise offset. One function triggers the other, but not the reverse.

---

This invention relates to logic systems, and has particular reference to such systems as operated entirely by and with fluids, with no moving parts. The usual fluid is air, although other fluids are acceptable.

This invention, more specifically, provides logic systems based on fluid diffusion functions. A fluid diffusion function with no moving parts is accomplished by providing input and output passages, separated by an open, free flow area. The input passage is sufficiently long to establish laminar fluid flow therethrough in view of the other parameters such as passage size and fluid pressure. The fluid thus is projected across the open space as a free flowing fluid stream in continued laminar form. At a particular point this free fluid stream will break up, in a natural diffusion action.

Accordingly, the entrance to the output passage is aligned with the input passage and spaced therefrom across the free flow opening, so that the point of natural diffusion lies just within the entrance of the output passage. As a result, the free flowing laminar fluid stream is very easily diffused by transverse application of a small control signal in the form of a fluid jet, applied close to the beginning of the free stream, at the exit of the entrance passage.

The result is a normal output when no control signal is applied, and a significantly reduced output when a control signal is applied. Thus the logic outputs of one and effective zero are provided.

This arrangement lends itself to amplification, and is particuarly useful as a logic function. Tiny passages and control jets may be used with control forces in the order of a few inches or less of water. Logic modules of this nature are small, and quiet.

This invention provides fluid logic diffusion means in a unique logic combination. The base form is two fluid diffusion functions in a single module, side by side, with their free streams close together. These diffusion functions are stepped lengthwise with respect to each other. The result is a useful one way logic action in that a control signal appied to one of the streams will cause it to diffuse, and in turn impinge on and diffuse the other of the streams. However, a control signal applied to the other of the streams will cause it only to diffuse since it is too far forward of the beginning of the first stream, and therefore does not have the position to cause diffusion in the first stream.

This invention makes possible various logic combinations, such as counters, and provides a fluid diffusion logic combination capable of producing output in terms of multiple, selectable frequencies.

It is therefore, an object of this invention to provide a new and useful logic device, based on staggered fluid diffusion functions.

Other objects and advantages of this invention will be in part apparent and in part pointed out hereinafter and in the accompanying drawings, in which:

FIGURE I is an illustration of a diffusion logic fluid system according to this invention. For clarity, the body is in dotted outline and one form of functioning passage complex is shown in full lines;

FIGURE II is a sectional view taken on line II—II of FIGURE I, as of the actual structure, illustrating the two plate assembly;

FIGURES III, IV, V and VI are views of the actual plate structure of FIGURES I and II;

FIGURE VII is a schematic illustration of the base function of this invention, wherein a control signal to one diffusion function results in diffusion of both functions;

FIGURE VIII illustrates a control signal to the other FIGURE VII diffusion function, the first remaining undisturbed;

FIGURE IX is a truth table of the operations illustrated in FIGURES VII and VIII;

FIGURES X and XI illustrate a combination of three staggered diffusion functions, and a truth table therefor;

FIGURES XII and XIII illustrate another combination of three diffusion functions, and a truth table therefor; and FIGURES XIV and XV illustrate a frequency output combination according to this invention, and a truth table therefor.

A structure of this invention is shown in FIGURES I through VI. In function, this illustrative example is related also to FIGURES X and XI. It is a thin rectangular body 10. This may be small, for example, of the order of an inch in length. It is made up of two thin plates 11 and 12, which are the same size and shape. They may, for example, be epoxy joined together together in a face-to-face layer arrangement as shown in FIGURE II.

In FIGURE I, the body 10 is outlined by a dotted line, and the operating passages are shown in full lines. This is illustrative only. Actual views of the top and bottom of each of the plates are shown as FIGURES III through VI. The passages may be formed by etching. As may be seen in FIGURE II, the same half section passages are etched in the top of the bottom plate 12 and in the bottom of the top plate 11. When the plates are joined, with the passages matched up, the passages have overall essentially rounded cross-section which is desirable for laminar flow.

In FIGURE I, the operating system starts at the left with the fluid supply inlet 13. This inlet extends through the top plate 11. It is relativey large to provide for full and sufficient power fluid input flow to the operating system.

A transverse power supply distribution passage 14 receives power fluid from the inlet 13 and leads it in two opposite directions as indicated by the arrows 15 and 16. From the distribution passage 14, power fluid input small passages 17, 18 and 19 extend in essentially parallelism lengthwise of the body 10.

The input passages 17, 18 and 19 empty into one end of large central opening 20. The opening 20 extends all the way through the body 10, and power fluid, when diffused, exits from the body 10 directly from the opening 20.

A power fluid output passage 21, 22, 23 is provided for and in alignment with each of the input passages. For example, laminar power flow exits from input passage 17 and is projected across the opening 20 in a free flow laminar stream, directly into the output passage 21. The point of natural diffusion is established as just inside the entrance to the output passage 21. The input 18 and output 21; and the input 19 and output 23 are similarly operatively related.

Transversely directed control input passages 24, 25 and 26 are provided respectively for the fluid streams from input passages 17, 18 and 19, adjacent the exit areas of these passages into the large opening 20. Considered individually, the application of a control signal in any one of the control input passages will result in diffusion of its respective power fluid stream, and also will result in significant reduction in the output in the respective output passage. Thus the logic output of one or effective zero is achieved in any one of the output passages 21, 22, 23.

Each input passage 17, 18, 19 has an essentially uniform exit opening. In this particular design, cut-back indents as at 27 are formed for this purpose.

According to this invention, these outputs are considered in logic combinations. See the related drawing of FIGURE X and its related truth table of FIGURE XI.

In this invention, the diffusion of one fluid stream is used to cause diffusion also in an adjacent fluid stream. The simplest form of this operation is in two streams as illustrated in FIGURES VII and VIII and their related truth table of FIGURE IX.

In FIGURE I, the illustrative structure is a three stream combination. As discussed later herein, the diffusion functions are laterally adjacent and arranged in offset steps lengthwise of the free flowing laminar fluid power streams. Thus the opening 20 is essentially a parallelogram on a bias across the rectangular form of the body 10.

In FIGURE I, the input passages 17, 18, 19 are essentially parallel, with the exit of 18 ahead of the exit of 17, and the exit of 19 ahead of the exit of 18. Since the optimal point of control signal application is near the exit of the input passage, diffusion of the fluid stream from input 17 will in turn diffuse the stream from input 18, but not the reverse.

The schematics of FIGURES VII and VIII could represent the first two diffusion functions of FIGURE I, and are related thereto by the same reference numbers, primed.

In FIGURE VII a control signal is applied to the fluid stream from the input 17'. This stream is diffused, and its diffusion reaches ahead and down and causes diffusion of the stream from input 18', although there is no control signal in the control input 25'. Thus the outputs $O_A$ and $O_B$ are both effectively zero.

In FIGURE VIII a control signal is applied only to the stream from the input 18'. This causes diffusion in that stream, but it is too far forward to cause diffusion in the stream from the input 17'. Thus the output $O_A$ is one, and the output $O_B$ is zero. The truth table of FIGURE IX relates to the operation of the system of FIGURES VII and VIII. Since each power flow input is equally supplied, the cascade effect can proceed for any member of diffusion systems, without diminution of effect.

The FIGURE X system illustrates the operation of the structure of FIGURE I, that is, a triple diffusion system. FIGURE X illustrates a control signal only at IA, but with diffusion at all of the systems A, B, C. Thus $O_A$, $O_B$ and $O_C$ are all zero. Further operational variants are indicated by the truth table of FIGURE XI as related to the system of FIGURE X.

The FIGURE XII illustrates a variant of the triple system in which diffusion function B is advanced with respect to diffusion function A, and diffusion function C is retarded with respect to diffusion function B. Thus, with a control signal on function A, outputs $O_A$ and $O_B$ are zero, but $O_C$ is one because the stream of function C is not diffused, the diffusion of function B being too far ahead of it. If however, a control signal were applied to function C, function B would be diffused, but not function A. Further operational variants are indicated by the truth table of FIGURE XIII as related to the system of FIGURE XII.

FIGURE XIV and its associated truth table in FIGURE XV illustrate a system according to this invention capable of producing outputs of different frequency.

A fluid power supply at 28 supplies input passages 29, 30 and 31, located in parallel, but lengthwise stepped to provide the diffusion cascade effect of this invention. In this example, only the output 32 of function A is used. The outputs 33 and 34 of function B and C are simply vented.

A programmer 35 is provided to direct the output 32 of function A as a control signal, selectively and one at a time, to functions A, B, or C. An oscillator effect is produced by such feedback. At function A, an output signal of one acts as a control input signal to diffuse the stream of function A and produce a function A output of zero. This in turn results in a function A output of one. And so on, at a frequency determined by the structure and flow limitations.

When, however, the output of function A is directed as a control signal to function B only, more time is consumed by first diffusing B function and then, in consequence, A function. Thus an output of less frequency is produced. An output of even less frequency is produced when the output of A function is directed only to C function, since added time is consumed in the action of all three diffusion steps in cascade.

This invention, therefore, provides a new and useful logic system, based on fluid diffusion amplifier functions and providing the unique system of cascading diffusion.

I claim:

1. A fluid diffusion logic system comprising separate power flow inputs directed to provide proximate power flow streams therefrom, separate output means individual to said inputs for separately receiving said streams, and control inputs individual to said streams, said power flow streams being lengthwise offset with respect to each other to such effect that diffusion of one power stream will in turn cause diffusion of the other, while said one power stream remains undisturbed when said other power stream is diffused.

2. A diffusion logic system according to claim 1, wherein said control inputs are each directed to apply a control fluid jet against its respective stream at a point adjacent the beginning of the stream at the exit of the input for that stream.

3. A diffusion logic system according to claim 1, which operates according to the truth table of FIGURE IX.

4. A diffusion logic system according to claim 1, in which there are more than two fluid amplifier streams in lengthwise increments of offset in the same direction and which operates on the basis of the truth table of FIGURE XI.

5. A diffusion logic system according to claim 1, in which there are more than two fluid amplifier streams with the lengthwise offset relation of at least one of said streams being forward in the lengthwise flow direction with respect to at least two of said streams, and which operates on the basis of the truth table of FIGURE XIII.

6. A diffusion logic system according to claim 1, wherein output in the form of frequency and different frequencies is provided by feedback from one of said outputs to more than one of said control inputs, with programming means to selectively direct said feedback to said control inputs singly and one at a time, with the resulting output from said one of said outputs an oscillator frequency function at a different frequency for each coupling of said feedback to a different one of said control inputs, and which operates on the basis of the truth table of FIGURE XV.

7. A diffusion logic system according to claim 1, in the form of a body constructed of two plates laid one on the other, with input and output passages formed by matching etched channels in said plate, with said inputs and outputs given access to said passages through one of said plates, and with said power streams flowing in a central opening in said body which extends through both of said plates.

References Cited

UNITED STATES PATENTS

| | | | |
|---|---|---|---|
| 3,080,886 | 3/1963 | Severson | 132—81.5 |
| 3,234,955 | 2/1966 | Auger | 137—81.5 |
| 3,299,255 | 1/1967 | Bauer | 137—81.5 XR |
| 3,340,885 | 9/1967 | Bauer | 137—81.5 |
| 3,348,562 | 10/1967 | Ogten | 137—81.5 |
| 3,366,131 | 1/1968 | Swartz | 137—81.5 |
| 3,386,709 | 6/1968 | Drayer | 137—81.5 XR |

SAMUEL SCOTT, *Primary Examiner.*